United States Patent
Kobayakawa

(10) Patent No.: US 8,051,705 B2
(45) Date of Patent: Nov. 8, 2011

(54) TIRE EQUIPPED WITH A SENSOR AND A METHOD OF MEASURING STRAIN AMOUNT OF THE TIRE

(75) Inventor: Akira Kobayakawa, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 92 days.

(21) Appl. No.: 12/514,701

(22) PCT Filed: Nov. 13, 2007

(86) PCT No.: PCT/JP2007/072013
§ 371 (c)(1),
(2), (4) Date: May 13, 2009

(87) PCT Pub. No.: WO2008/059838
PCT Pub. Date: May 22, 2008

(65) Prior Publication Data
US 2010/0043541 A1    Feb. 25, 2010

(30) Foreign Application Priority Data

Nov. 14, 2006  (JP) ................. 2006-307513
Nov. 14, 2006  (JP) ................. 2006-307517

(51) Int. Cl.
*G01M 17/02* (2006.01)
(52) U.S. Cl. ........................................... 73/146
(58) Field of Classification Search .................. None
See application file for complete search history.

(56) References Cited

U.S. PATENT DOCUMENTS

| | | | |
|---|---|---|---|
| 6,105,423 | A | 8/2000 | Prottey |
| 7,236,892 | B2 | 6/2007 | Ogawa |
| 7,370,523 | B2 | 5/2008 | Kitazaki et al. |
| 2002/0162389 | A1 | 11/2002 | Yokota et al. |
| 2005/0188754 | A1* | 9/2005 | Ogawa ..................... 73/146 |
| 2006/0090835 | A1 | 5/2006 | Mancosu et al. |
| 2006/0111853 | A1 | 5/2006 | Ogawa |
| 2006/0207319 | A1* | 9/2006 | Krozer et al. ............. 73/146 |
| 2007/0213953 | A1 | 9/2007 | Kitazaki et al. |
| 2007/0240502 | A1* | 10/2007 | Morinaga et al. ........ 73/146 |

(Continued)

FOREIGN PATENT DOCUMENTS

EP    1619051 A1    1/2006

(Continued)

OTHER PUBLICATIONS

Supplementary European Search Report dated Dec. 29, 2010.

*Primary Examiner* — Andre Allen
(74) *Attorney, Agent, or Firm* — Sughrue Mion, PLLC

(57) ABSTRACT

This invention provides a tire (10) equipped with a sensor (14), attached to a rubber member (15) in the surface of the tire (10), for detecting deformation of the tire (10). The sensor (14) is adhered to the rubber member (15) with the aid of an elastic adhesive formed of a room-temperature moisture cure adhesive agent composed mainly of an acryl modified silicone resin or the like. The adhesive between the sensor (14) and the rubber member (15) is cured to form an elastic adhesive layer (16). According to the above constitution, the deformation of the rubber member (15) in the tire surface can be transmitted to the sensor (14) with high accuracy, and, at the same time, the durability of the sensor (14) can be improved.

8 Claims, 10 Drawing Sheets

U.S. PATENT DOCUMENTS

| | | | |
|---|---|---|---|
| 2007/0295069 A1* | 12/2007 | Mancosu et al. | 73/146 |
| 2008/0289407 A1* | 11/2008 | Gramling et al. | 73/146.5 |
| 2009/0114005 A1* | 5/2009 | Blixhavn et al. | 73/146.5 |

FOREIGN PATENT DOCUMENTS

| | | |
|---|---|---|
| JP | 09-237398 A | 9/1997 |
| JP | 2002-240520 A | 8/2002 |
| JP | 2005-170223 A | 6/2005 |
| JP | 2005343281 A | 12/2005 |
| JP | 2006-145366 A | 6/2006 |
| JP | 2006-151057 A | 6/2006 |
| JP | 2006-193119 A | 7/2006 |
| JP | 2006-290228 A | 10/2006 |
| JP | 2006-306171 A | 11/2006 |
| WO | 2005/118317 A1 | 12/2005 |

* cited by examiner

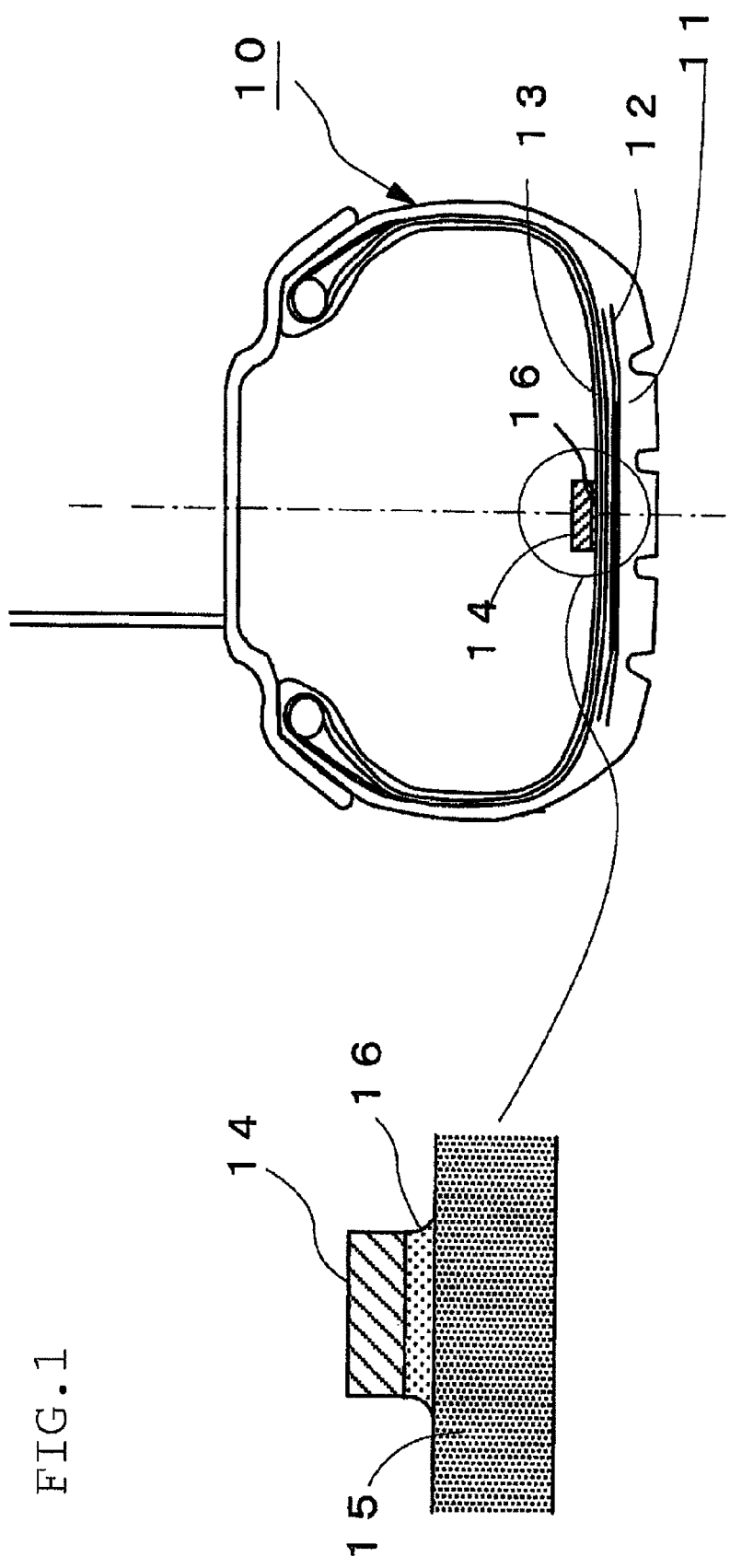

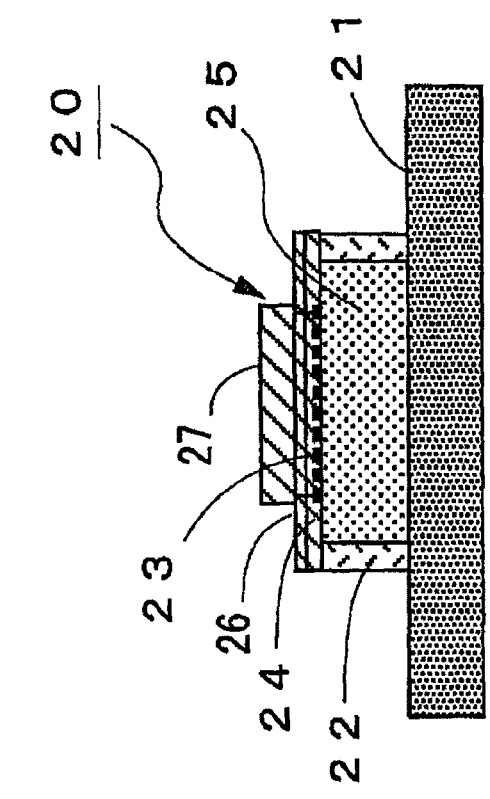
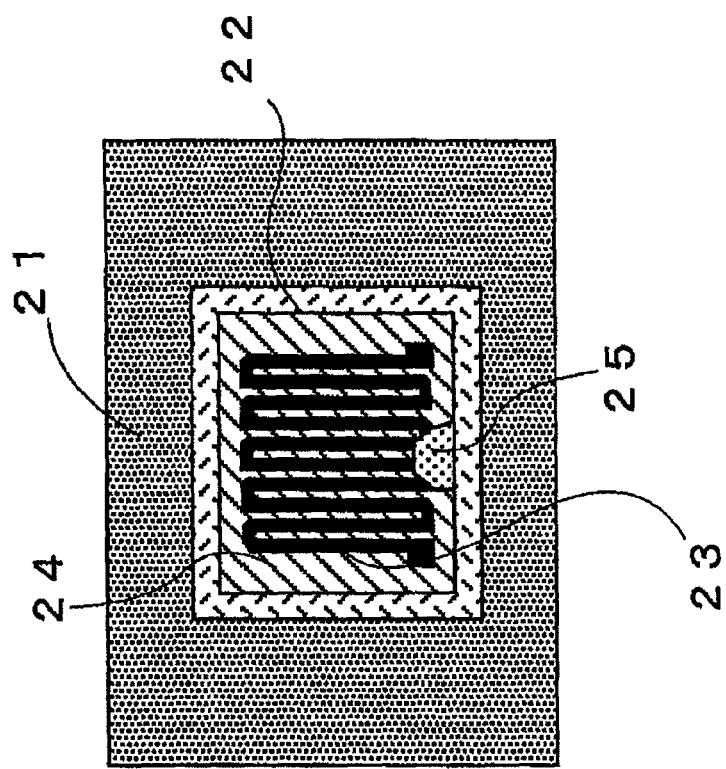
FIG. 3(a)
FIG. 3(b)

FIG.10
BEFORE RUNNING
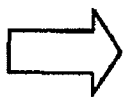
AFTER RUNNING
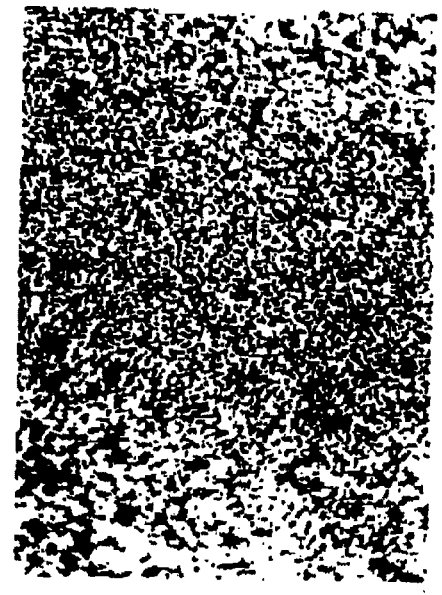
WITH LAMINATING
WITHOUT LAMINATING

TIRE EQUIPPED WITH A SENSOR AND A METHOD OF MEASURING STRAIN AMOUNT OF THE TIRE

FIELD OF THE INVENTION

The present invention relates to a tire equipped with a sensor, which the sensor such as a strain gage or a piezoelectric element is disposed on a surface portion of the tire or a rubber member in an interior of the tire.

BACKGROUND OF THE INVENTION

Conventionally, it has been well known to measure deformation of a tire by sticking or burring a piezoelectric sensor, which is composed of a piezoelectric element such as a PZT provided with an electrode, to a surface of the tire or convert stress or pressure, which are applied to the piezoelectric element, to electric energy so as to utilize such energy as a power supply for driving other sensor such as an acceleration sensor attached to an inner side of the tire. The sensor such as the piezoelectric element or the strain gauge is mounted on a substrate on which an amplifier for amplifying output of sensor and a power supply are mounted and is protected by a housing. A deformation part of the sensor is adhered to the rubber member by an adhesive so as to closely contact with the rubber member of the surface of the tire. (for example, make reference to reference 1 to 3 as follows)
Reference 1:
Japanese Unexamination Patent Application Publication No. H09-237398
Reference 2:
Japanese Unexamination Patent Application Publication No. 2002-240520
Reference 3:
Japanese Unexamination Patent Application Publication No. 2006-193119

DISCLOSURE OF THE INVENTION

Problems to be Solved by the Invention

As the adhesive for sticking the sensor (or sensor module) to the rubber member of the tire, a cyanoacrylate quick-drying adhesive is generally used, because an adhesive layer formed by it is thin, and working property thereof is excellent. However, according to such conventional art, sufficient initial adhesive performance and adhesive durability cannot be obtained, though adhesive performance can be obtained. Also, in a vehicle traveling, tire strain fluctuates within ± a few %. Therefore, for example, in case of that the piezoelectric sensor is used, the tire strain is directly input to the sensor to exceed durability limit of the piezoelectric element sensor. Therefore, it is difficult to measure and generate electricity for long term.

The present invention have been made to resolve the above conventional problem. It is object of the present invention to transmit deformation of the rubber member that is caused on the surface of the tire precisely and improve durability of the sensor, by using the tire equipped with the sensor that the sensor attached to the rubber member of the surface of the tire.

Means for Solving the Problem

According to a first aspect of the present invention, there is provided a tire equipped with a sensor, the sensor measuring vibration or deformation of the tire and disposed on a surface portion of the tire wherein an adhesive layer, which is formed by curing an elastic adhesive that becomes an elastic body after cure, is intervened between a rubber member on the surface portion of the tire and the sensor. The sensor may be a member reinforcing a detection part of a sensor element, a sensor substrate or a sensor housing.

According to a second aspect of the present invention, there is provided the tire equipped with the sensor, wherein a reinforcement member, which is made of a film-like member which covers an overall surface including a detection surface of the sensor or an overall surface opposite to the surface including the detection surface and has larger stiffness than stiffness of the sensor and a constant thickness, or a lamination member that is formed by laminating the film-like member and has a constant thickness, is disposed on at least one of the surface including the detection surface of the sensor and the surface opposite to the surface including the detection surface.

According to a third aspect of the present invention, there is provided the tire equipped with the sensor, wherein the elastic adhesive is a room temperature moisture cure type adhesive.

According to a fourth aspect of the present invention, there is provided the tire equipped with the sensor, wherein a chief ingredient of the elastic adhesive is any of an acrylic modified silicone resin, an epoxy modified silicone resin, a polychloroprene synthetic rubber or a silylated urethane resin.

According to a fifth aspect of the present invention, there is provided the tire equipped with the sensor, wherein an area of a contact surface that the adhesive layer contacts with a deformation part of the sensor is 60% or more of an area of the deformation part.

According to a sixth aspect of the present invention, there is provided the tire equipped with the sensor, wherein a thickness of the adhesive layer is 3.0 mm or less.

According to a seventh aspect of the present invention, there is provided the tire equipped with the sensor, wherein an elastic modulus of the adhesive layer is in the range of 0.1 to 100 Mpa and tan δ is less than 0.1.

According to an eighth aspect of the present invention, there is provided a tire equipped with the sensor comprising a piezoelectric element sensor including a detection part having a piezoelectric element and an electrode and disposed on a surface portion of the tire or in an interior of the tire, wherein a reinforcement member, which covers an overall surface including a detection surface and an overall surface opposite to the surface including the detection surface and has larger stiffness than stiffness of the piezoelectric element, is disposed on at least one of the surface including the detection surface of the sensor and the surface opposite to the surface including the detection surface. According to a ninth aspect of the present invention, there is provided the tire equipped with the sensor, wherein the reinforcement member is a film-like member having a constant thickness. According to a tenth aspect of the present invention, there is provided the tire equipped with the sensor, wherein the reinforcement member is a lamination member having a constant thickness and formed by laminating the film-like member.

According to a eleventh aspect of the present invention, there is provided the tire equipped with the sensor, wherein stiffness of the film-like member forming the lamination member on a side that is near to the piezoelectric element is larger than stiffness of the film-like member on an side that is far away the piezoelectric element.

According to a twelfth aspect of the present invention, there is provided the tire equipped with the sensor, wherein the reinforcement member is made of a resin selected from at least one of a polyamide, a polyester, a polyimide, a nylon, a polytetrafluoroethylene, a polyethylene, a polypropylene, an EVA, a polyurethane or a polyvinyl chloride.

According to a thirteenth aspect of the present invention, there is provided the tire equipped with the sensor, wherein the piezoelectric element sensor comprising the reinforcement member is adhered to a tire member by using an elastic adhesive which becomes a elastic body after cure.

According to a fourteenth aspect of the present invention, there is provided the tire equipped with the sensor, wherein the reinforcement member is disposed on the surface opposite to the surface including the detection surface at least, and an electronic device for radio communication, which includes an antenna, is formed on the reinforcement member.

According to a fifteenth aspect of the present invention, there is provided a method of measuring a strain amount of a tire comprising steps of detecting strain amount of the tire by using the sensor of the tire equipped with the sensor according to the first aspect of the present invention, correcting the detected strain amount of the tire in accordance with each of the elastic modulus and thickness of the adhesive layer, the rubber member of the tire and the sensor. According to a sixteenth aspect of the present invention, there is provided a method of measuring a strain amount of a tire comprising steps of detecting strain amount of the tire by using the sensor in the tire equipped with the sensor according to the thirteenth aspect of the present invention, correcting the detected strain amount of the tire in accordance with each of elastic modulus and thickness of the adhesive layer, the rubber member of the tire and the reinforcement member.

According to a seventeenth aspect of the present invention, there is provided a method of measuring a strain amount of a tire comprising steps of detecting strain amount of the tire by using the sensor in the tire equipped with the sensor according to the first or thirteenth aspect of the present invention, obtaining a relation between a sensor strain $\epsilon$ that is the detected strain amount and a tire strain $\epsilon_0$ that is strain amount of the rubber member provided with the sensor obtained in advance, and correcting the detected sensor strain $\epsilon$ in accordance with the relation.

Effect of the Invention

According to the present invention, the adhesive layer made of the room temperature moisture adhesive such as an acrylic modified silicone resin, an epoxy modified silicone resin, a polychloropren synthetic, which become an elastic body after cure, is formed on between the rubber member on the surface of the tire and the sensor measuring vibration from the tire or deformation of the tire. Through this adhesive layer, deformation of the rubber member on the surface of the tire is transmitted to the sensor so that deformation of the rubber member can be transmitted to the sensor accurately and high abruption adhesive strength can be secured with respect to input that strain of the rubber is large and includes bending mode. Therefore, according to the present invention, vibration of the tire or deformation amount of the tire can be detected. Also, the tire equipped with the sensor according to the present invention has excellent durability. At this point, an area of a contact surface that the adhesive layer contacts with the deformation part of the sensor is 60% or more of the deformation part so that deformation of the rubber member can be transmitted to the sensor accurately. Also, to transmit deformation of the rubber member accurately, it is preferable that the thickness of the adhesive layer is 3.0 mm or less and elastic modulus of the same falls in the range of 0.1 to 100 Mpa (−40° C. to 120° C.) and tan δ<0.1 (−40° C. to 120° C.).

When the piezoelectric element sensor including the detecting part composed of the piezoelectric element and the electrode is arranged on the surface of the tire or in the interior of the tire, a reinforcement member, which is made of a film-like member that is made of polyamide, polyester or polyimide, covers an overall surface including a detection surface of the sensor or an overall surface opposite to the surface including the detection surface and has larger stiffness than that of the sensor and a constant thickness, or a lamination member that is formed by laminating the film-like member, is disposed on at least one of the surface including the detection surface of the sensor and an surface opposite to the surface including the detection surface. Thereby, the tire equipped with the sensor having excellent running durability with respect to large input or high frequency input can be obtained. The piezoelectric element sensor provided with the reinforcement member disposed on at least one of the surface including the detection surface of the sensor and the surface opposite to the surface including the detection surface is adhered to the tire member by using the elastic adhesive which becomes the elastic body after cure. Thereby, durability of the piezoelectric element sensor can further be improved and deformation of the tire can be transmitted to the piezoelectric element accurately.

While the reinforcement member is provided on at least the surface opposite to the surface including the detection surface, an electronic device for radio communication including an antenna is formed on the reinforcement member by a screen print or the like so that the tire equipped with the sensor including a compact module integrated with sensor and radio can be made readily.

Strain amount of the tire detected in the sensor in the tire equipped with the sensor is corrected in accordance with each of elastic modulus and thickness of the elastic adhesive layer, the rubber member of the tire and the sensor so that strain amount of the tire can be measured accurately. Also, strain amount of the tire detected in the sensor in the tire equipped with the sensor is corrected in accordance with each of elastic modulus and thickness of the elastic adhesive layer, the rubber member of the tire and the sensor so that strain amount of the tire can be measured accurately. Further, even when a relation between sensor strain that is strain amount detected in the sensor $\epsilon$ and tire strain $\epsilon_0$ that is strain amount of the rubber member is obtained in advance and strain amount of the tire detected in the sensor in the tire equipped with the sensor is corrected in accordance with the relation, tire strain $\epsilon_0$ may be measured accurately.

BRIEF DESCRIPTION OF THE DRAWINGS

FIG. 1 is a diagram showing fundamental construction of a tire with sensor according to preferred embodiment according to the present invention.

FIG. 3 is a schematic diagram showing a sample used in an example of the present invention.

FIG. 10 is a diagram showing condition of an electrode of piezoelectric sensor after the endurance test is completed.

REFERENCE SYMBOL LIST

Figure 2A:
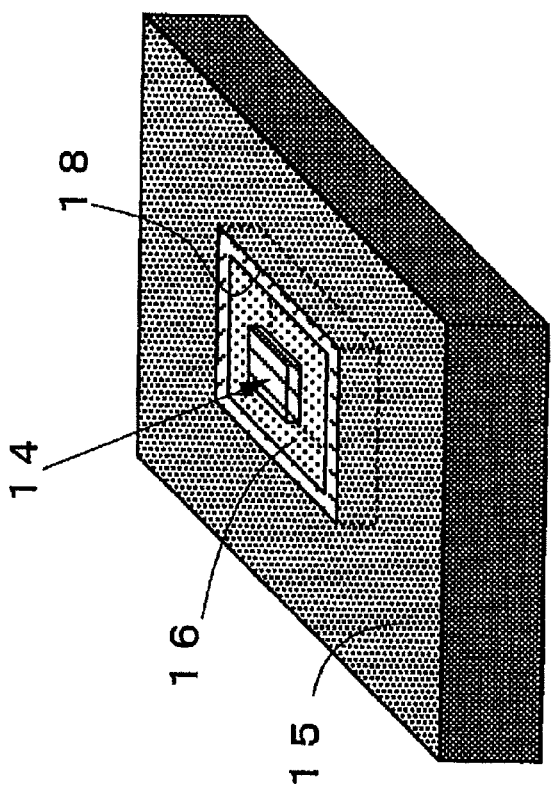
FIG. 2 is a diagram showing a method of forming an elastic adhesion layer according to the present invention.

10 and 10P the tire equipped with sensor, 11 the tire tread, 12 the belt layer, 13 the inner liner portion, 14 the sensor, 15 the rubber member on the surface portion of the tire, 16 and 36 the adhesive layer formed by curing the elastic adhesive, 17 the frame, 18 the pit, 34 the piezoelectric element sensor, 35 the sensor reinforcement member, 37 the electronic device.

BEST MODE FOR CARRYING OUT THE INVENTION

The preferred embodiment is explained as follow, with making reference to the drawings.

Preferred Embodiment 1

The FIG. 1 is a diagram illustrating the tire equipped with the sensor according to the preferred embodiment 1. In this Figure, a numeral reference 11 denotes a tire tread, 12 denotes a belt layer, 13 denotes an inner liner portion of the tire, 14 denotes a sensor which is attached to a rubber member 15 of a surface portion of the tire which is a rubber member of the inner liner portion 13 and 16 denotes an elastic adhesive layer for sticking the sensor to the rubber member 15 on the surface of the tire (hereafter, to be referred as "rubber member"). The elastic adhesive layer 16 is formed by curing the elastic adhesive that becomes elastic body after cure. The sensor 14 may be a sensor element such as a strain gauge or a piezoelectric element, a substrate on which a power supply for the sensor element, an amplifier and so on are mounted, a housing for receiving and protecting the sensor element and the substrate and a film for coating a reinforcement member for reinforcing them or the sensor. As the elastic adhesive, a room temperature moisture type adhesive containing any one of acrylic modified silicone resin, epoxy modified silicone resin, polychloroprene synthetic rubber or silylated urethane resin as a chief ingredient is preferably used. In order to transmit deformation of the rubber member 15 to the sensor 14 accurately, the elastic modulus of the elastic adhesive layer 16 preferably is in the range of 0.1 to 100 Mpa and loss coefficient (tan $\delta$) thereof is preferably less than 0.1. When the elastic modulus is less than 0.1 Mpa or tan $\delta$ exceeds 0.1, though vibration and impact can be absorbed, deformation itself is large so that it is difficult to transmit deformation of the rubber member 15 to the sensor 14 precisely. On the other hand, when the elastic modulus exceeds 100 Mpa, difference between stiffness of the elastic adhesive layer 16 and that of the rubber member 15 is large. This gives rise to problem in that the elastic adhesive layer brake away a tire rubber. Regarding the elastic modulus, needless to say, it is required to use an elastic adhesive that hardly depends on temperature under condition within −40° C. to 120° C. Also, it is preferable that tan $\delta$ hardly depends on temperature.

It is preferable that the thickness of the elastic adhesive layer is equal to or less than 3 mm. In the case of that the thickness of the elastic adhesive layer exceeds 3 mm, the elastic adhesive layer itself is largely deformed. Thereby it is difficult to transmit the deformation of the rubber member 15 to the sensor accurately. On the other hand, it is requested for the elastic adhesive layer to have a thickness that it does not break. It is known that minimum value $\delta$ of the thickness depends on a sensor length l, a limit extension d of the elastic adhesive and maximum strain applied to the tire $\epsilon$. Therefore, regarding the minimum value $\delta$, factor of safety is set with respect to the limit extension d and value is set so as to satisfy following formula.

$$\delta \geq \frac{\epsilon l}{\sqrt{(\alpha d)^2 + 2\alpha d}} \quad \text{[formula 1]}$$

For example, where $\epsilon=0.05$, $l=10$ mm, $\alpha=0.1$, $d=1.5$ is set, a maximum thickness of the adhesive layer is $\delta=0.88$ mm.

Thickness of the elastic adhesive layer 16, the elastic modulus and tan $\delta$ is set as above so that the elastic adhesive layer 16 can transmit deformation of the rubber member 15 to the sensor 14 accurately and absorb external vibration and impact from outside. Therefore, since stress is hardly concentrated to exert on an adhesive-interface and high separation adhesive strength can be performed with respect to input including bending mode, durability of the sensor can be improved largely.

Next, a method of forming the elastic adhesive layer 16 is explained as follows. In order to keep the accuracy of the sensor detection, it is required to make the thickness of the elastic adhesive layer 16 of uniform. To realize that, according to this embodiment, as shown in the FIG. 2(a), a frame (17) which is used for temporally blocking and has an area that an area of an opening thereof is larger than an area of the adhesive surface is provided on the rubber member 15 of the surface portion of the tire by a non-adhesion resin. The elastic adhesive is fed to in the frame 17 up to surface position of the frame 17. And then the sensor 14 is mounted thereon to cure the adhesive so that the adhesive layer having uniform thickness can be formed. A pattern may be formed on a mold and a bladder in curing the tire. The frame may be formed in curing the tire. Instead of the frame 17, a pit 18 may be provided thereon, as shown in FIG. 2(b). The frame or the pit is formed at the same time to cure so that a position on which the elastic adhesive layer 16 is set accurately. Thereby, positioning of the sensor 14 can be performed readily and accurately. Also, when the frame 17 or the pit is composed of a rubber member, the elastic modulus of the elastic adhesive is equal to that of the surface portion of the tire of the rubber member 15 so that detection accuracy of the sensor 14 can be improved further.

Since the adhesive layer 16 is the elastic body, a sensor input is buffered rather than an actual tire input. Therefore, by using the elastic modulus of the elastic adhesive and the elastic modulus of the sensor, the tire input must be obtained from the buffered input. Hereby, where as tire strain is $\epsilon_0$ and sensor strain is $\epsilon$, this sensor strain is represented as $\epsilon_0 = C \cdot \epsilon$, with using correction coefficient C. This correction coefficient C is represented as following formula, where $K_1=(E_1 t_1 + Et)w/l$, $K_3=(E_3 t_3 + Et)w/l$ and $k=Glw/t$, as the thickness of the adhesive layer is t, the elastic modulus is E, its shear elastic modulus is G, the thickness of the rubber member of the tire is $t_1$, the elastic modulus $E_1$, the thickness of the sensor is $t_2$, the width of the sensor is w, the length of the sensor is l and the elastic modulus is $E_2$.

$$\frac{1}{C} = \frac{\varepsilon}{\varepsilon_0} = \frac{kK_1}{K_1(k+K_2)+kK_2} \quad \text{[Formula 2]}$$

Figure 2B:
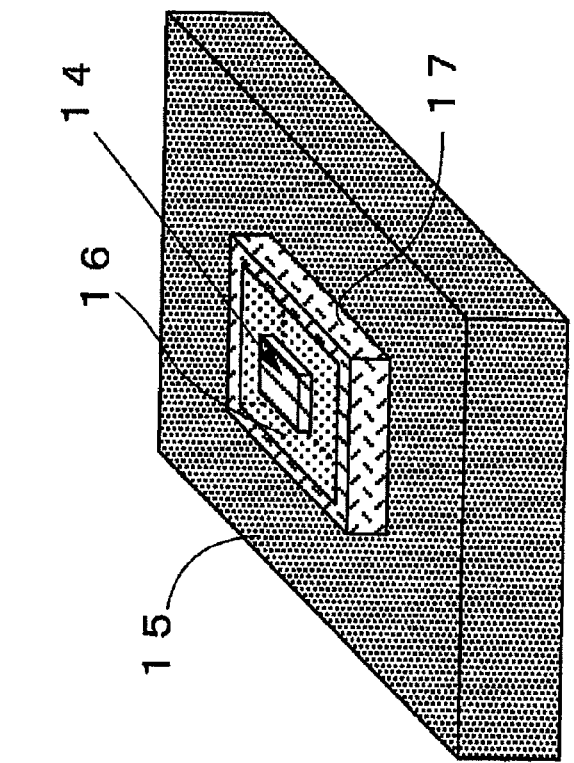

However, when applying amount of the elastic adhesive is large or the frame or the pit is arranged as shown in FIG. 2(a) and 2(b), the correction coefficient must be calculated in accordance with its shape. When temperature change of the elastic modulus of the elastic adhesive or the sensor substrate is significant, a temperature sensor may be arranged in the vicinity of the sensor, in order to measure temperature change of the elastic modulus of the elastic adhesive or the sensor substrate. By measured temperature change of these elastic modulus, buffered correction coefficient may be calculated. When there is frequency dependence in the elastic modulus (tan δ of the elastic adhesive is large), frequency correction may be used with respect to sensor input frequency, together.

As above, according to the preferred embodiment 1, the sensor 14 for detecting deformation of the tire 10 is adhered to the rubber member 15 on the surface portion of the tire. This adhering is performed by using the elastic adhesive composed of a room temperature moisture type adhesive containing any one of acrylic modified silicone resin, epoxy modified silicone resin, polychloroprene synthetic rubber or silylated urethane resin as a chief ingredient. By curing the adhesive, the elastic adhesive layer 16 is formed. The elastic adhesive layer 16 is interposed between the sensor 14 and the rubber member 15 so that deformation of the tire 10 can be transmitted to the sensor 14 accurately and durability of the sensor 14 can be improved largely.

Also, the thickness of the elastic adhesive layer 16 is 3 mm or less while the adhesive that the elastic modulus is in the range of 0.1 to 1000 Mpa and loss coefficient (tan δ) is less than 0.1 is used so that deformation of the sensor 14 can be transmitted to the sensor 14 accurately and durability of the sensor 14 can be improved largely. Further, the frame 17 or the pit 18 is mounted on the rubber member 15 of the surface portion of the tire and the elastic adhesive is fed in the frame 17 or the pit 18. The sensor is mounted on the frame 17 or the pit 18 to cure the adhesive so that the thickness of the elastic adhesive layer 16 becomes uniform certainly and deformation of the tire can be transmitted to the sensor 14 accurately.

In the preferred embodiment, the case where the sensor 14 is attached to the rubber member 15 on the inner liner portion 13 of the tire is explained. However, the present invention should not limit to the case where the sensor 14 is attached to the surface portion of the rubber member inside of the tire. The sensor 14 may be attached to a surface portion of a rubber member outside of the tire such as a tire tread or a side portion.

According to the embodiment, as shown in the FIG. 1, width and length of the elastic adhesive layer 16 is configured to be equal to width and length of the sensor 14. That is, the elastic adhesive layer 16 is provided on over the surface of the sensor 14. However, as width and length of the elastic adhesive layer 16, an area of a contact surface contacting a deformation part of the sensor 14 is 60% or less of the area of the deformation part so that deformation of the rubber member 15 can be transmitted to the sensor 14 sufficiently. The whole sensor may be covered with a rubber sheet so as to reinforce adhesive performance between the sensor and the tire and prevent the sensor from contacting with the outside.

Example 1

Test of Verifying Accurately

A test sample has been prepared as follows. As shown in the FIG. 3, an epoxy modified silicone adhesive was fed into a frame 22 which was disposed on a rubber piece 21 having 2 mm of thickness by using a dispenser. A PET film 24 having t=0.05 mm and 10 mm on which strain gauge 23 for the test of verifying accuracy having 2 mm of the sensor length was patterned was adhered onto there. It was cured for 7 days at 23° C. Then an elastic adhesive layer 25 is interposed between the strain gauge 23 and the rubber piece.

Figure 4:
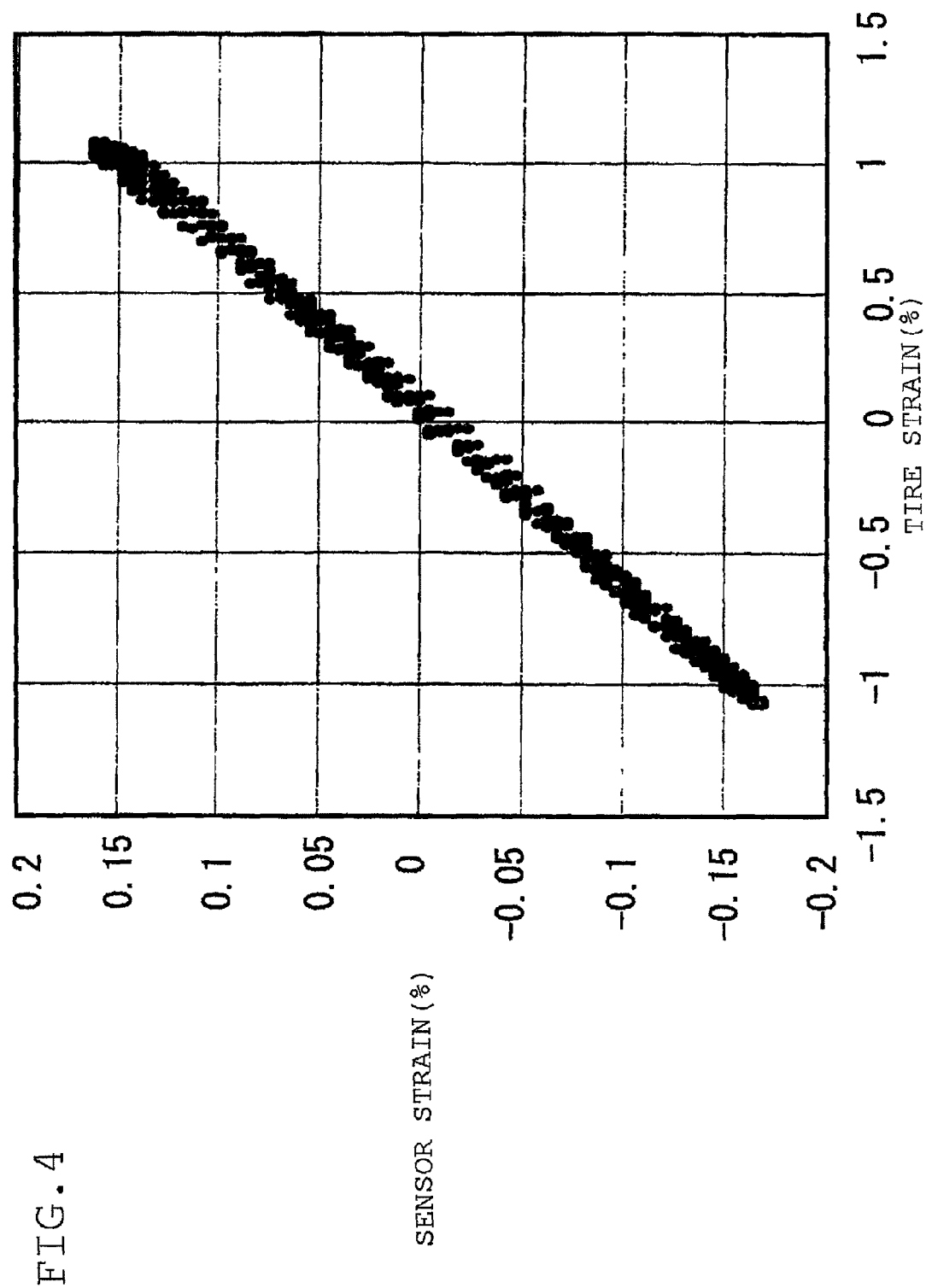
FIG. 4 is a diagram showing relation between tire distortion and sensor distortion in case of that a strain tester feed a vibration to a sample to be tested.

In the FIG. 3, numeral 26 denotes a substrate and 27 denotes and a circuit portion including detection circuit and a communication circuit. Various vibrations were applied to the rubber piece 21 of the test sample 20 by a tensile testing machine. The FIG. 4 shows relation between input and output from the strain gauge 23. In the FIG. 4, a lateral axis indicates input strain (%) applied to the rubber piece 21. Since this input strain (%) corresponds to strain of the tire in vehicle running, it represents tire strain (%) in the FIG. 4. Also, a vertical axis indicates sensor strain (%) which is ratio of output signal of the strain gauge 23 with respect to input.

As clear from the FIG. 4, magnitude of sensor strain (%) is ⅙ as many measurements as tire strain (%). Therefore, though magnitude of strain themselves was buffered, tire strain (%) and sensor strain (%) indicated high interrelation. Thereby, it was confirmed that deformation of the rubber member would be transmitted to the sensor accurately, through the elastic adhesive layer according to the present invention, which was formed by curing the adhesive.

Test for Verifying Adhesion Performance

Firstly, a frame as shown in the FIG. 2 was disposed in an interior of a tire. Additionally, a PET film on which a strain gauge is patterned under condition of the above Test of verifying accurately was adhered to the tire. Adhesion performance was verified by using a car equipped with the tire in 1000 km of distance. For comparison, the tire that the PET film was adhered by cyanoacrylate which is a quick-dry adhesive is used in the same test. As normal usage, cyanocarylate was applied as thinly as possible. In the result, according to the PET that was adhered by cyanoacrylate, adhesive-separation occurred at 100 km point. On the other hand, according to the tire to which the PET film was adhered by the elastic adhesive, adhesive-separation did not occur after running whole distance. Therefore, it was confirmed that the elastic adhesive has excellent durability.

Also, 50 Hz and 2.5% of strain was applied to the sample used in the test for verifying accuracy by the fatigue testing machine. In the result, output signal was detected after vibration was applied to the sample at fifty million times (a hundred thousand by running conversion). Therefore, it was confirmed that the adhesive layer according to the present invention has high durability with respect to fatigue fracture.

Preferred Embodiment 2

Figure 5A:
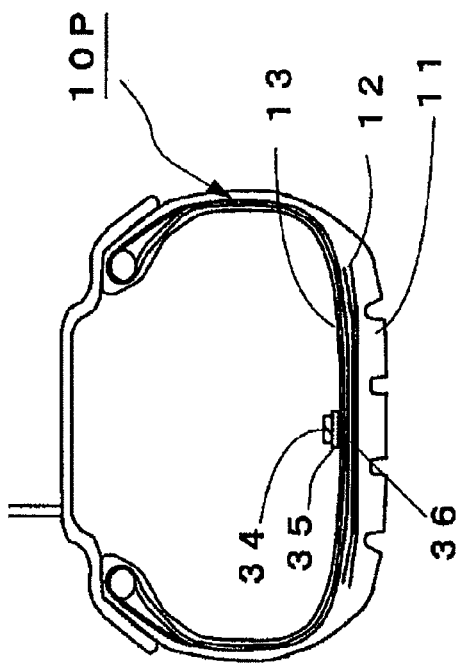
FIG. 5 is a diagram showing fundamental construction of a tire with sensor according to embodiment 2 of the present invention.
Figure 5C:
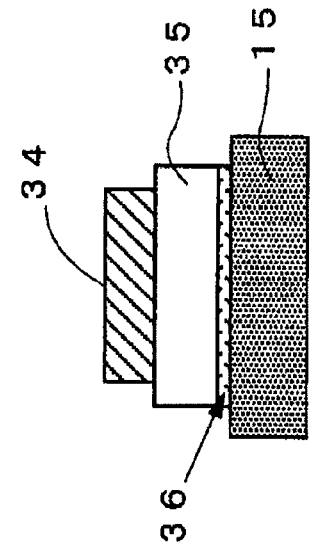
Figure 5B:
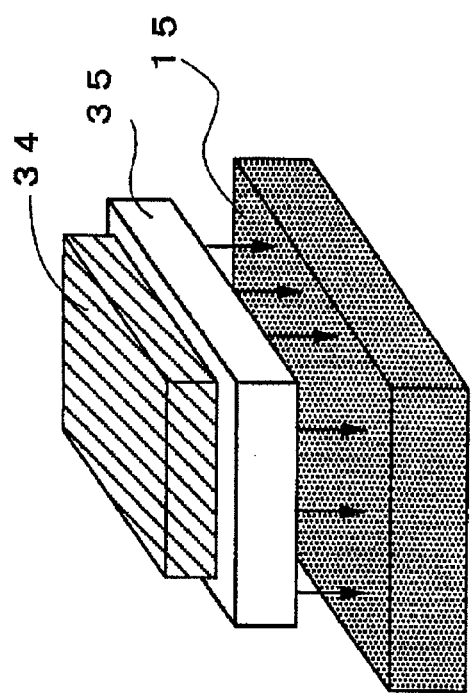

The FIG. 5 (a) to (c) is schematic view of a method of attaching the piezoelectric element sensor to the tire equipped with the sensor according to the preferred embodiment 2. In this figure, numeral 11 denotes the tire tread, 12 denotes the belt layer, 13 denotes the inner liner portion of the tire, 34 is the piezoelectric element sensor attached to the rubber member 15 on the surface portion of the tire, which is the rubber member of the inner liner portion 13, 35 denotes the sensor reinforcement member attached to the contact surface so as to cover the overall surface of the contact surface, and 36 denotes the elastic adhesive layer of sticking the piezoelectric element sensor 34 with the rubber member 15. The piezoelectric element sensor 34 comprises the piezoelectric element provided with the electrode and detects deformation amount of the tire. The elastic adhesive layer 36 is same adhesive layer as that of the adhesive layer 16 according to the preferred embodiment 1. Therefore, it is formed by curing the elastic adhesive that becomes the elastic body after cure.

In this embodiment, as the sensor reinforcement member 35, a film-like member that stiffness of it is larger than that of the piezoelectric element sensor 34 and thickness of it is constant, while stiffness of the sensor reinforcement member 35 is set so that total stiffness of the sensor, which put the piezoelectric element sensor 34 together the sensor reinforcement member 35, becomes uniform.

Stiffness of the piezoelectric element sensor 34 and the sensor reinforcement member 35 is represented by the product of thickness D and Young's modulus Y of each member. As the subscript 1 indicates the piezoelectric element sensor and the subscript 2 indicates the sensor reinforcement member, to make total sensor stiffness uniform, which put the piezoelectric element sensor 34 together the sensor reinforcement member 35, it is preferred that stiffness ratio=$(D_2 \cdot Y_2)/(D_1 \cdot Y_1)$ is 10 or more.

As above, overall surface on the contact surface side, which is the detection surface of the piezoelectric element sensor 34, was covered with the sensor reinforcement member 35, which has larger stiffness than that of the piezoelectric element sensor 34, and total strain of the sensor, that put the piezoelectric element sensor 34 together the sensor reinforcement member 35, was made to be uniform. Thereby, since input to the piezoelectric element sensor 34 is buffered, durability of the piezoelectric element sensor 34, that is, durability of the tire equipped with the sensor 10P can be improved.

Figure 6A:
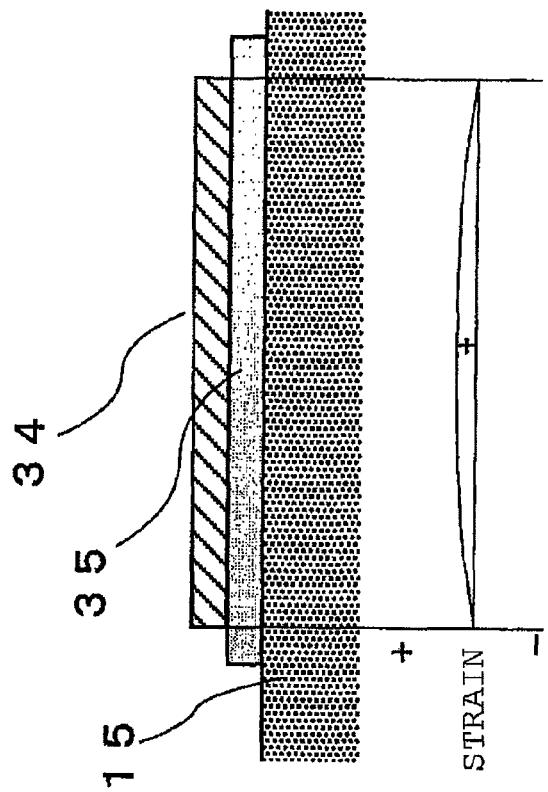
FIG. 6 is a diagram for explaining function of sensor reinforcement member.
Figure 6B:
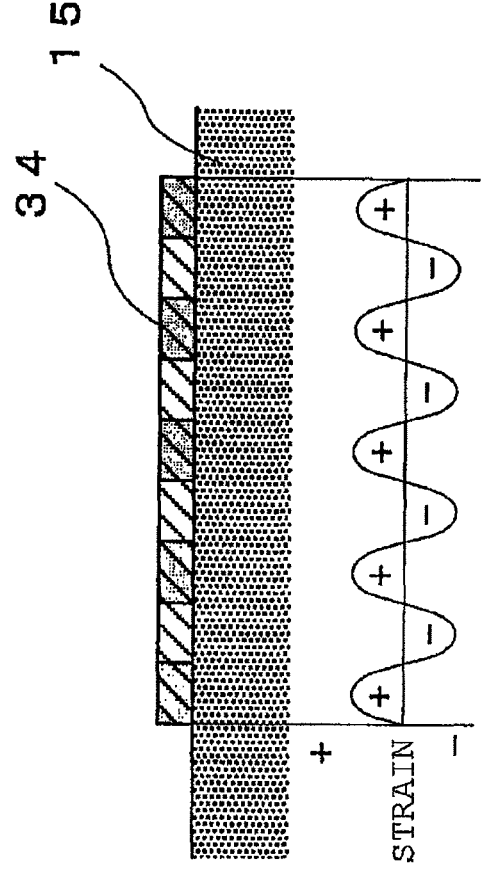

When tire input is high-frequency (i.e. wave length is short) and the reinforcement member is not used, as shown in the FIG. 6 (a), local strain is input to the piezoelectric element sensor 34. If magnitude of the local strain is large, the piezoelectric element sensor 34 may be destructed. On the other hand, in this embodiment, as shown in the FIG. 6 (b), the sensor reinforcement member 35 is disposed so that total strain, which put the piezoelectric element sensor 34 together the sensor reinforcement member 35, can be uniform. Thereby, partial strain is not occurred in the piezoelectric element sensor 34. Therefore, durability of the piezoelectric element sensor 34 can be improved largely.

As the piezoelectric element used in the piezoelectric element sensor 34 according to this embodiment, well-known piezoelectric element sensor, such as lead zirconate titanate (PZT), barium titanate, quartz crystal, cadmium sulfide, polyvinylidene difluoride (PVDF) polyvinyl chloride and so on, may be used.

Gold, cupper or the like would be used as material constituting the electrode. However, because of the prevention of cracks, soft material such as gold may preferably be subjected to a screen-printing on the piezoelectric element to form the electrode. A conductive rubber may be used as the material constituting the electrode.

As the sensor reinforcement member, it may be preferred that a film-like resin, which has constant thickness, such as polyamide, polyester, polyimide, nylon, polytetrafluoroethylene, polyethylene, polypropylene, EVA, polyurethane or polyvinyl chloride is used.

In order to transmit deformation of the rubber member 15 to the piezoelectric element sensor 34 accurately, it is required that stiffness of the sensor reinforcement member 35 is 1 kN/m~100 kN/m and loss coefficient is less than 0.1. That is, in case of where stiffness of is less than 1 kN/m or loss coefficient (tan δ) exceeds 0.1, it is difficult to transmit deformation of the rubber member 15 to the piezoelectric element sensor 34 accurately, though effect of easing vibration and impact is large. To the contrary, when stiffness exceeds 100 kN/m, since deformation of the sensor itself with respect to input is small, it is difficult to measure it accurately. Regarding stiffness, needless to say, it is required to use a resin having small temperature dependency within −40~120° C. that is operating temperature range. Also, it is required that tan δ having small temperature dependency. Any one of physical processing such as ultraviolet radiation-irradiation processing, corona discharge processing, plasma processing or the like, chemical processing that pharmaceutical used or mechanical processing, is performed in advance so that adhesive performance can be improved.

An elastic adhesive for forming the adhesive layer 36 is the same as elastic adhesive according to the embodiment 1. The adhesive layer 36 has buffering effect with respect to vibration and impact. Also, in order to transmit deformation of the rubber member 15 to the piezoelectric element sensor 34 or the sensor reinforcement member 35 accurately, it is preferred that the elastic modulus of the elastic adhesive are in the range of 0.1 to 100 Mpa and loss coefficient (tan δ) is less 0.1. Also, it is preferred that the thickness of the adhesive layer 36 is 3 mm or less, as the preferred embodiment 1. Therefore, when the thickness of the adhesive layer 36 exceeds 3 mm, deformation of the adhesive layer itself is large. Thereby, it is difficult to transmit deformation of the rubber member 15 to the piezoelectric element sensor 34 accurately.

It is required that the thickness of the adhesive layer 36 is sufficient thickness that the distraction due to strain occurs. It is preferred for minimum value δ that the safety factor α is set with respect to the limit extension d and set to be value as meeting following a formula 3

$$\delta \geq \frac{\varepsilon l}{\sqrt{(\alpha d)^2 + 2\alpha d}} \quad \text{[formula 3]}$$

For example, as ε=0.05, l=10 mm, α=0.1 and d=1.5, minimum thickness of the adhesive layer 36 is δ=0.88 mm.

The thickness, the elastic modulus and tan δ of the adhesive layer 36 is set as above so that deformation of the rubber member 15 can be transmitted to the piezoelectric element sensor 34 or the sensor reinforcement member 35 accurately and external vibration and impact can be absorbed.

The sensor reinforcement member 35 and the adhesive layer 36 is disposed between the rubber member 15 and the piezoelectric element sensor 34 so as to buffer tire input. Therefore, when tire input is obtained, it is need to obtain tire input from the buffered tire input by using the elastic modulus of the sensor reinforcement member 35 and the adhesive layer 36.

Where tire strain is $\varepsilon_0$ and sensor strain ε, with using correction coefficient, sensor strain ε is represented as $\varepsilon_0 = C' \cdot \varepsilon$. This correction coefficient is represented by following formula, where $K_1 = (E_1 t_1 + Et)w/l$, $K_3 = (E_3 t_3 + Et)w/l$ and k=Glw/t, as the thickness of the adhesive layer is t, the elastic modulus are E, its shear elastic modulus are G, the thickness of the rubber member of the tire is $t_1$, the elastic modulus of the rubber member of the tire are $E_1$, the thickness of the sensor reinforcement member 35 is $t_3$, the width of the sensor is w, length of the sensor is l and the elastic modulus of the sensor reinforcement member 35 is $E_3$.

$$\frac{1}{C'} = \frac{\varepsilon}{\varepsilon_0} = \frac{kK_1}{K_1(k+K_3) + kK_3}$$ [formula 4]

The width and length of the adhesive layer 36 and the sensor reinforce member 35 is set to be equal to the sensor width w and sensor length l, respectively. In this embodiment, amount of input buffered by the sensor is disregarded, because it is small as compared with amount of input buffered by the sensor reinforcement member.

When elastic constant of the sensor reinforcement member 35 has temperature dependence, temperature of the buffered correction coefficient may be corrected by arranging other temperature sensor.

As above, according to the preferred embodiment 2, the sensor equipped with the sensor 10P including the piezoelectric element sensor 34 on the surface of the tire or in the interior of the tire, has feature that the film-like member made of the polyester resin or the like, which covers the overall surface on the contact surface side contacting with the tire being the detection surface of the piezoelectric element sensor and has larger stiffness than that of the piezoelectric element sensor 34, is disposed, the sensor reinforcement member 35 is adhered to the rubber member 15 on the surface of the tire by using the adhesive which becomes the elastic body after cure and the sensor reinforcement member is intervened between the piezoelectric element sensor 34 and the rubber member 15. Thereby, stiffness of the whole sensor is large uniformly so that input to the piezoelectric element sensor 34 can be buffered effectively. Also, due to the effect of buffering, durability of the piezoelectric element sensor can be improved. Therefore, there is provided the tire equipped with the sensor 10P having excellent durability.

Also, there is provided the tire equipped with the sensor capable of detecting deformation of the tire, since the deformation of the rubber member 15 on the surface of the tire to the piezoelectric element sensor 34 certainly.

In the embodiment 2, it is explained to use the tire equipped with the sensor 10P including the piezoelectric element sensor 34 for detecting deformation of the tire. However, according to the present invention, a piezoelectric element sensor generating electricity may be used. Also, in the embodiment, it is explained that the piezoelectric element sensor 34 is attached to the inner liner portion 13. However, the present invention should not be limited to them. According to the present invention, the piezoelectric element sensor may be arranged on the tire tread portion, a tire side as a side portion or the interior of the tire as the interior of the tread block. When the piezoelectric element sensor 34 attached to the interior of the tire, a surface opposite to the rubber member of the sensor reinforcement member 35 may be adhered to the tire member by using the adhesive which becomes the elastic body after cure. Also, a surface opposite to this surface or both of surfaces may be adhered to the tire member by using same elastic adhesive.

In the above embodiment, a surface of a side contacting with the tire, which is a detection surface of the piezoelectric element sensor 34, is wholly covered with the sensor reinforcement member 35. However, as shown in the FIG. 7 (*a*), a surface opposite to the surface contacting with the tire of the sensor 34 may wholly be covered with the sensor reinforcement member 35. In this case, it is important that stiffness of the sensor reinforcement member 35 is larger than that of the piezoelectric element sensor 34. When stiffness ratio is 10 or more, total stiffness of the piezoelectric sensor and the sensor reinforcement member becomes almost uniform. Also, as shown in the FIG. 7(*a*), it is preferred to use the adhesive which becomes the elastic body after cure and interpose the adhesive layer 36 used in the embodiment 1 between the piezoelectric element sensor and the rubber member 15, when the piezoelectric element sensor 34 is directly adhered to the rubber member 15.

Figure 7A:
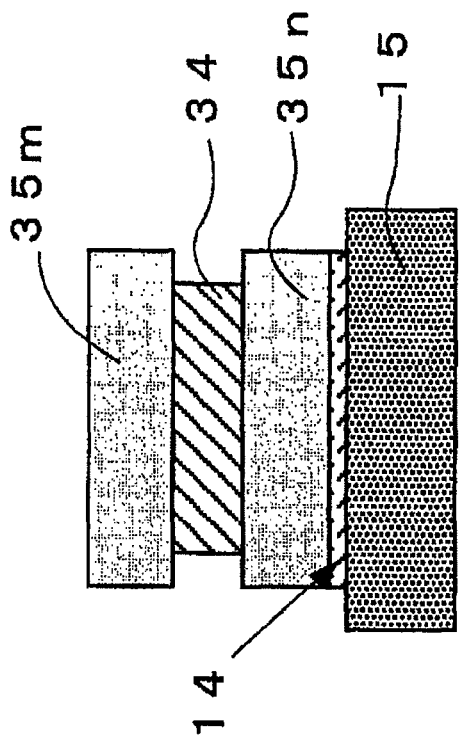
FIG. 7 is a diagram showing another alignment of the sensor reinforcement member according to the present invention.
Figure 7B:
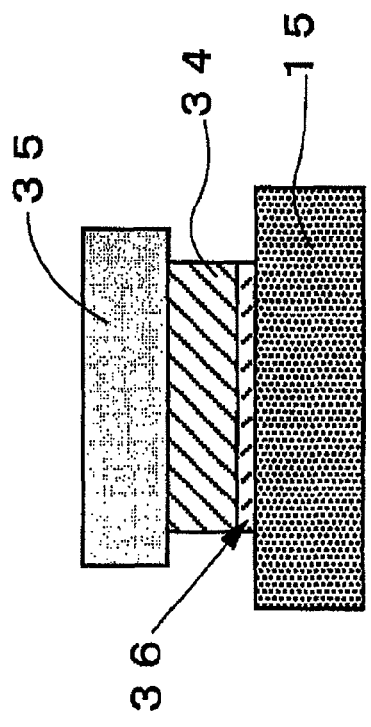
Figure 7C:
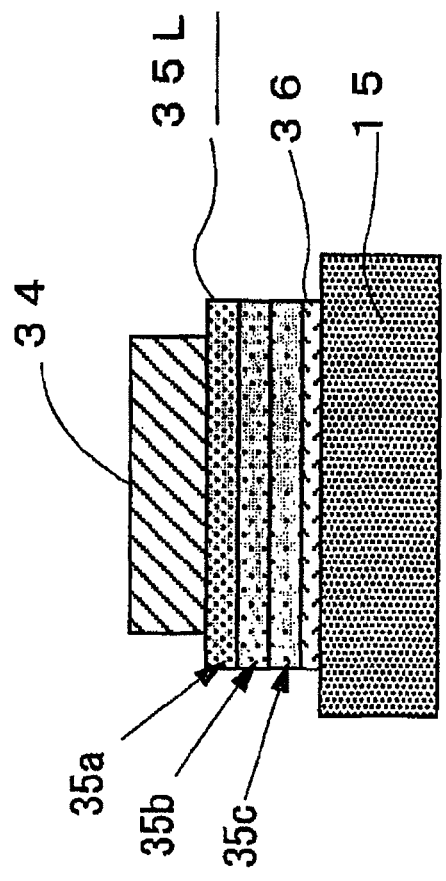

As shown in the FIG. 7 (*b*), both of the surface contacting with the tire of the piezoelectric element sensor 34 and the surface opposite to it are covered with the sensor reinforce member 35*m* and 35*n*, respectively. Thereby, the same effect can be obtained.

As shown in the FIG. 7(*c*), the sensor reinforcement member 35L formed by laminating the film-like resin 35*a*, 35*b* and 35*c* may be used. In this case, it is important that stiffness of the film-like resin 35*a*, 35*b* and 35*c* on a side that is near to the rubber member 15 of the surface portion of the tire is smaller than that on the side that is far away it. Thereby, the tire input can be buffered more effectively.

Figure 8:
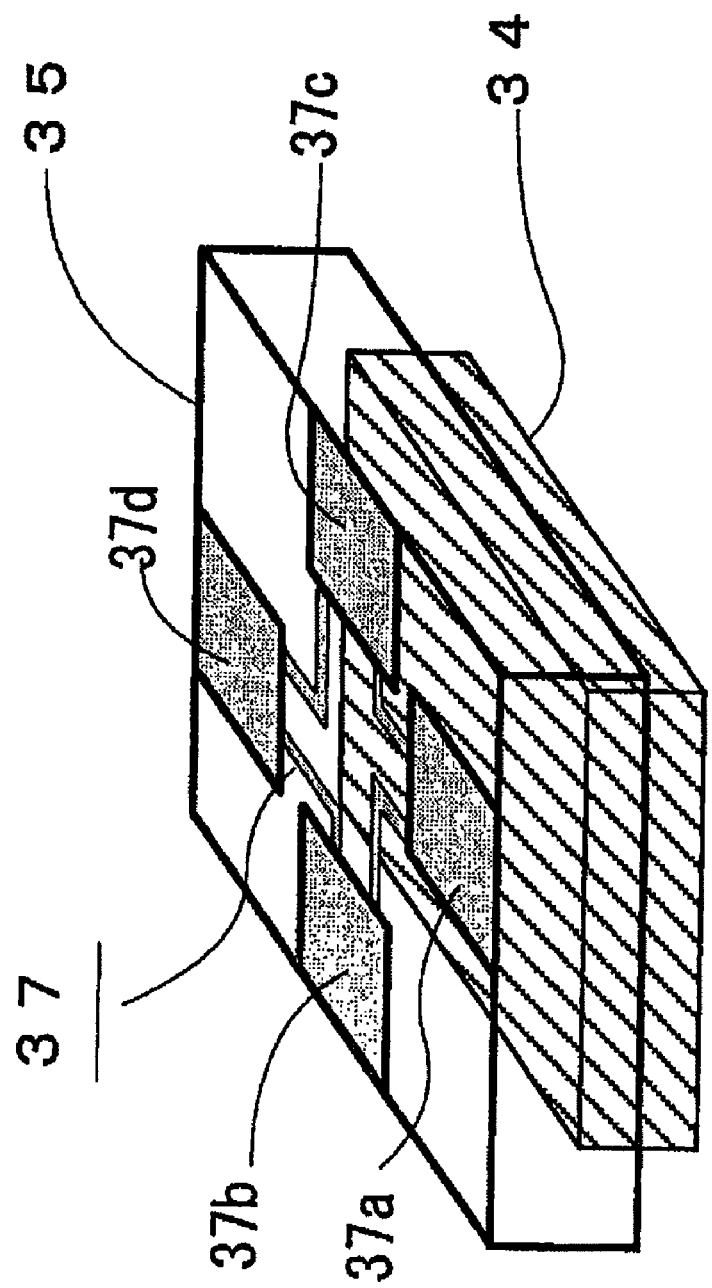
FIG. 8 is diagram showing a example for the sensor module according to the present invention.

As shown in the FIG. 8, the sensor reinforcement member 35 (or the sensor reinforcement member 35L) is provided with the surface opposite to the detection surface of the piezoelectric element sensor 34 at least, and an electronic device for a radio communication such as an A-D converter 37*a*, a signal process circuit 37*b*, a radio circuit 37*c* or an antenna 37*d* is formed on the sensor reinforcement member 35 by a screen printing so that a piezoelectric element module in which a compact sensor and a radio are integrated can be obtained.

Example 2

Figure 9:
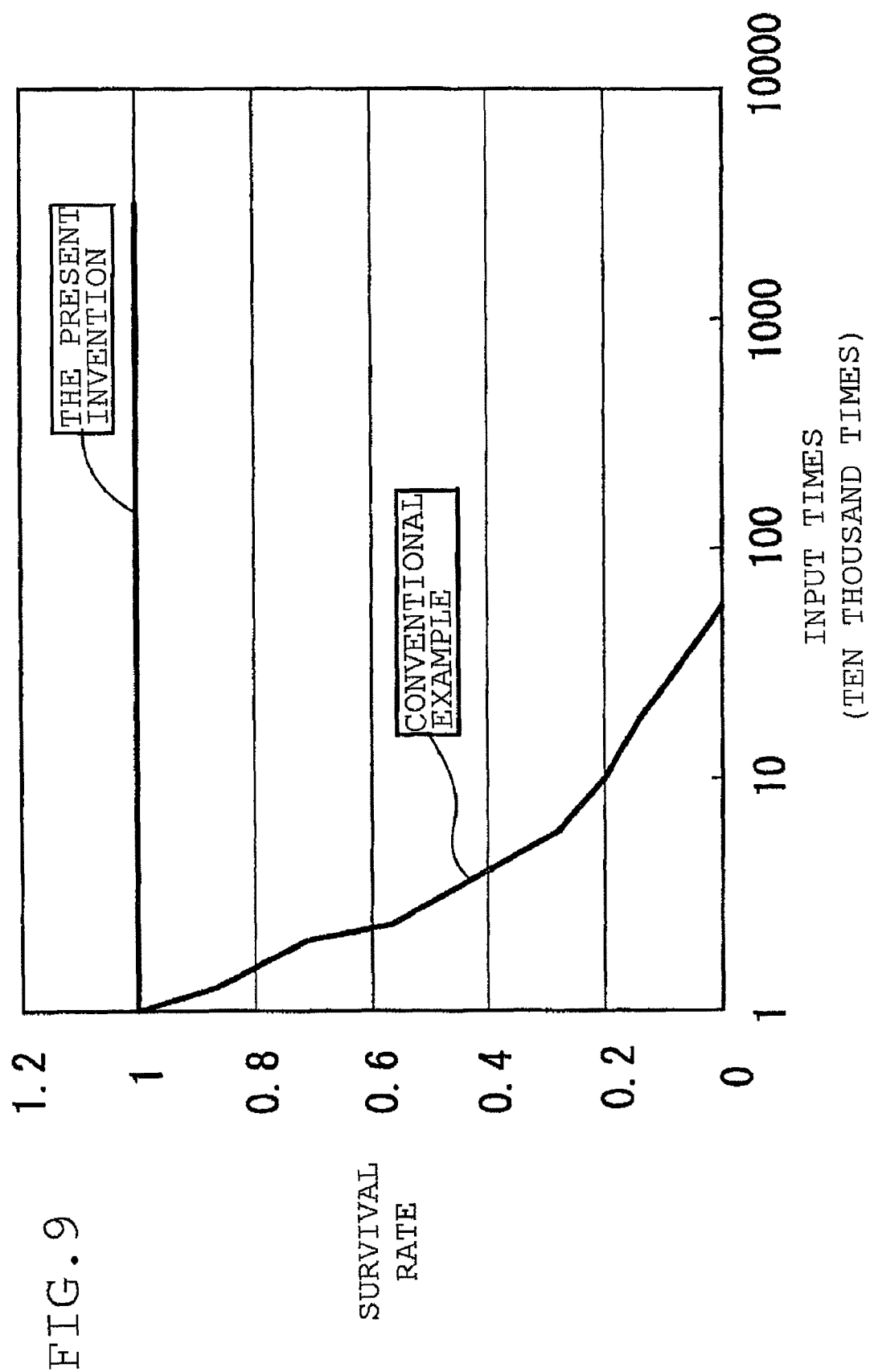
FIG. 9 is showing a result of endurance test.

In an experiment, it has been used as a sample that piezoelectric element sensor including a PVDF as the piezoelectric element and a piezoelectric element sensor including a PVDF that one side thereof are covered with polyester laminate (thickness of 0.1 mm) as piezoelectric element is respectively adhered to a rubber piece. Using a fatigue testing machine (MMT-250 made by Shimadzu corp.) and inputting ±2.5% strain having a sine wave form of 50 Hz to the rubber piece, durability test is performed 5 million times. The adhesive is applied to them as thinly as possible. A graph of the FIG. 9 shows the result of the test. In the FIG. 9, the lateral axis indicates inputting times and the vertical axis indicates survival rates of the piezoelectric element sensor. As it is clear from the graph, all of piezoelectric sensors without the reinforcement have been failed before the test has been performed one million times. On the other hand, since the piezoelectric element sensor covered with the polyester laminate according to the present invention has durability over 5 million times, it has been confirmed that the method of attaching the piezoelectric element sensor is used so that durability of the piezoelectric element sensor can be improved greatly.

Additionally, the FIG. 10 is an enlarged photograph of the electrode of piezoelectric element sensor before and after running, when the tire equipped with the piezoelectric element sensor was placed under test running in an indoor tester at predetermined speed. After running, there are many cracks on the surface of the piezoelectric element sensor without the reinforcement. On the other hand, with respect to repeatedly inputting to the piezoelectric element sensor over 5 million times, there scarcely are cracks causing for failure thereon.

Industrial Applicability

As explained above, according to the present invention, the deformation of the rubber member on the surface of the tire can be transmitted to the sensor precisely and durability of the sensor can be improved largely. Therefore, deformation condition of the tire can be measured stably. When running control of the vehicle is performed in accordance with such information, running safety of the vehicle can be enhanced. Also, when the present invention is applied to the piezoelectric sensor used as a driving power supply such as an acceleration sensor equipped with the tire, power is stably supplied over long term.

The invention claimed is:

1. A tire equipped with a sensor, the sensor measuring vibration or deformation of the tire and disposed on a surface portion of the tire wherein an adhesive layer, formed of a cured elastic adhesive, is intervened between a rubber member on the surface portion of the tire and the sensor, and reinforcement member, which is made of a film-like member which covers an overall surface including a detection surface of the sensor or an overall surface opposite to the surface including the detection surface and has a larger stiffness than stiffness of the sensor and a constant thickness, or a lamination member that is formed by laminating the film-like member and has a constant thickness, is disposed on at least one of the surface including the detection surface of the sensor and the surface opposite to the surface including the detection surface.

2. The tire equipped with the sensor according to claim 1, wherein the elastic adhesive is a room temperature moisture cure type adhesive.

3. The tire equipped with the sensor according to claim 2, wherein a chief ingredient of the elastic adhesive is any of an acrylic modified silicone resin, an epoxy modified silicone resin, a polychloropren synthetic rubber or a silylated urethane resin.

4. The tire equipped with the sensor according to claim 1, wherein an area of a contact surface that the adhesive layer contacts with a deformation part of the sensor is 60% or more of an area of the deformation part.

5. The tire equipped with the sensor according to claim 1, wherein a thickness of the adhesive layer is 3.0 mm or less.

6. The tire equipped with the sensor according to claim 1, wherein an elastic modulus of the adhesive layer is in the range of 0.1 to 100 Mpa and tan $\delta$ is less than 0.1.

7. A method of measuring a strain amount of a tire comprising steps of:
detecting strain amount of the tire by using the sensor of the tire with the sensor according to claim 1;
correcting the detected strain amount of the tire in accordance with each of the elastic modulus and the thickness of the adhesive layer, the rubber member of the tire and the sensor.

8. A method of measuring a strain amount of a tire comprising steps of:
detecting strain amount of the tire by using the sensor in the tire with the sensor according to claim 1;
obtaining a relation between a sensor strain $\epsilon$ that is the detected strain amount and a tire strain $\epsilon_0$ that is strain amount of the rubber member provided with the sensor, in advance, and correcting the detected sensor strain $\epsilon$ in accordance with the relation.

* * * * *